US009626392B2

(12) United States Patent
Jenkins et al.

(10) Patent No.: US 9,626,392 B2
(45) Date of Patent: Apr. 18, 2017

(54) CONTEXT TRANSFER FOR DATA STORAGE

(71) Applicant: SCHLUMBERGER TECHNOLOGY CORPORATION, Sugar Land, TX (US)

(72) Inventors: Chase Jenkins, Houston, TX (US); Hallgrim Ludvigsen, Stavanger (NO); Todd Olsen, Spring, TX (US); Rene Radhay, Houston, TX (US); Trond Benum, Trondheim (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 157 days.

(21) Appl. No.: 14/227,961

(22) Filed: Mar. 27, 2014

(65) Prior Publication Data

US 2014/0297584 A1     Oct. 2, 2014

Related U.S. Application Data

(60) Provisional application No. 61/806,712, filed on Mar. 29, 2013.

(51) Int. Cl.
*G06F 17/30* (2006.01)
*G06Q 10/06* (2012.01)
*G01V 99/00* (2009.01)

(52) U.S. Cl.
CPC .. *G06F 17/30303* (2013.01); *G06F 17/30345* (2013.01); *G06F 17/30563* (2013.01); *G06Q 10/06* (2013.01); *G01V 99/00* (2013.01)

(58) Field of Classification Search
CPC combination set(s) only.
See application file for complete search history.

(56) References Cited

U.S. PATENT DOCUMENTS

| 7,769,722 | B1 * | 8/2010 | Bergant | G06F 11/2097 707/681 |
| 7,873,710 | B2 | 1/2011 | Kiley et al. | |
| 7,895,225 | B1 * | 2/2011 | Thirumalai | G06F 17/3071 707/748 |
| 2003/0200159 | A1 * | 10/2003 | Kay | G06Q 10/087 705/28 |

(Continued)

FOREIGN PATENT DOCUMENTS

WO     2005033980 A1     4/2005

OTHER PUBLICATIONS

Bina, et al., "Enhancement of Geosciences Workflow through an Efficient, User-Friendly Database Management System", Nov. 14, 2012, Abu Dhabi International Petroleum Conference and Exhibition, SPE-161536-MS, 10 pages.

(Continued)

*Primary Examiner* — Etienne Leroux
(74) *Attorney, Agent, or Firm* — Colin Wier

(57) ABSTRACT

A method for context transfer for data storage is disclosed. The method includes receiving, from an analysis environment, a request to load a data item for analysis, creating, based on the request, a task request including context information of the data item, transmitting the task request to a data manager environment, receiving, from the data manager environment, an approval of the task request based on the context information, and loading the data item in a master data store in response to the approval.

20 Claims, 11 Drawing Sheets

(56) References Cited

U.S. PATENT DOCUMENTS

| | | | |
|---|---|---|---|
| 2004/0019396 A1* | 1/2004 | McMahon | G11B 27/034 700/94 |
| 2007/0112776 A1* | 5/2007 | Motoyama | G06Q 10/06 |
| 2008/0091496 A1 | 4/2008 | Gurpinar et al. | |
| 2008/0208475 A1 | 8/2008 | Karr et al. | |
| 2009/0037225 A1 | 2/2009 | Burchianti et al. | |
| 2010/0121861 A1 | 5/2010 | Marsden et al. | |
| 2012/0117104 A1 | 5/2012 | Stundner et al. | |

OTHER PUBLICATIONS

"Oracle Identity Governance 11g R2 PS1-Creating a Paralell Approval Process Overview", Jun. 5, 2012, Retrieved from Internet: http://www.oracle.com/webfolder/technetwork/tutorials/obe/fmw/oim/oim_11g/creating_a_paralllel_approval_process/CustomizingOIG-ParallelApprovalWorkflow.pdf, 97 pages.
Office Action issued in related EP application 14775099.6 on Mar. 21, 2016, 7 pages.
European Search Report issued in related EP application 14775099.6 on Mar. 4, 2016, 6 pages.

* cited by examiner

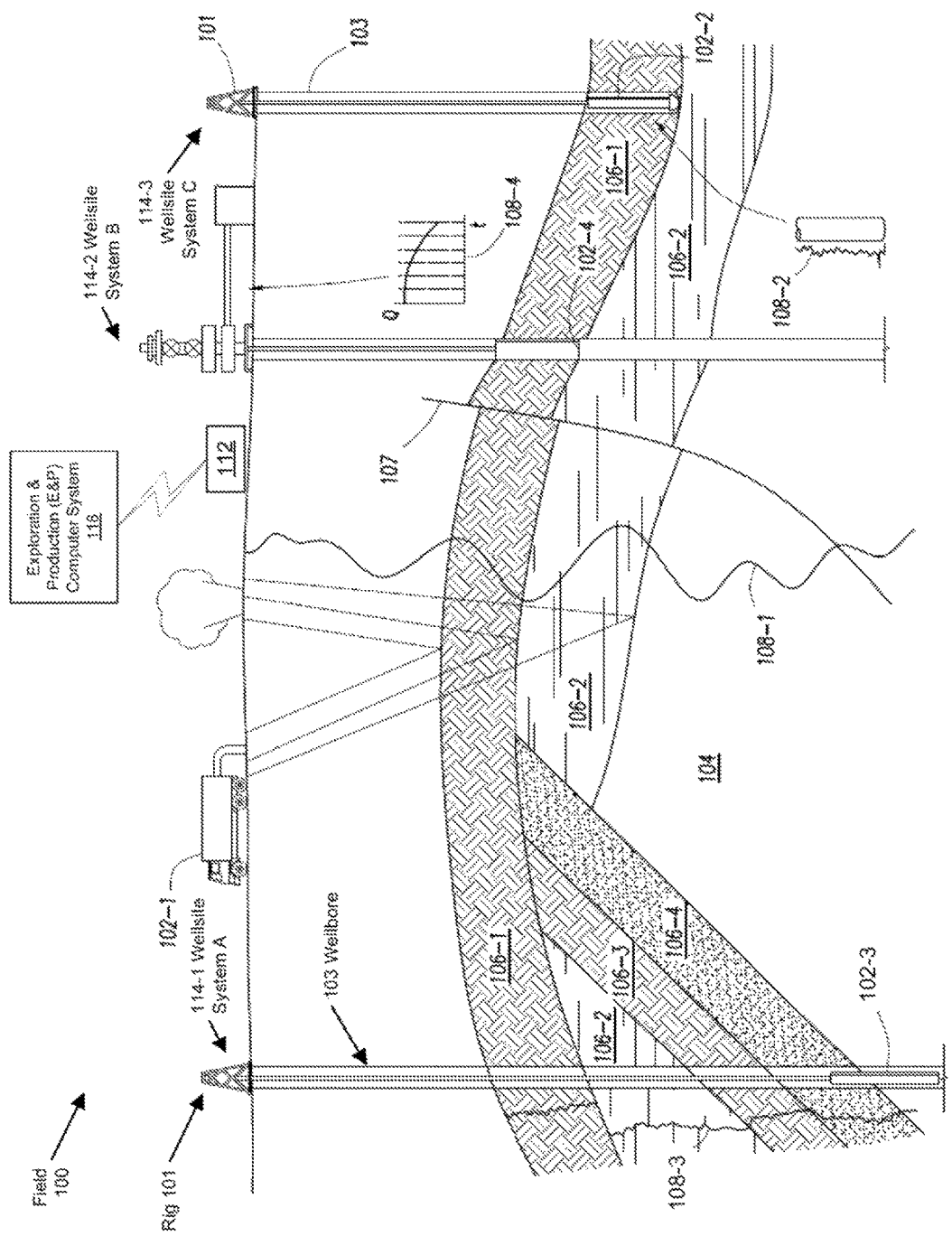
FIG. 1.1

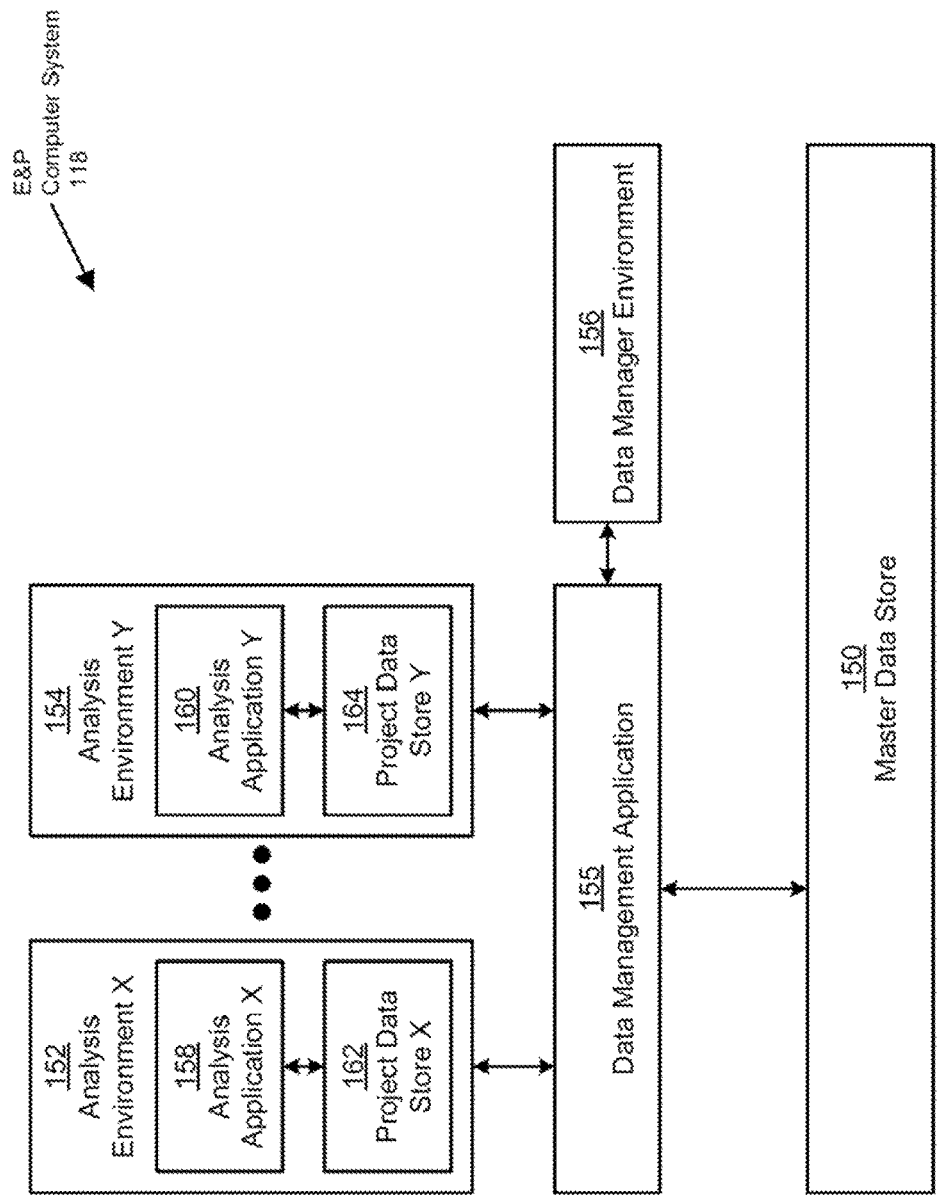
FIG. 1.2

CONTEXT TRANSFER FOR DATA STORAGE

CROSS REFERENCE TO RELATED APPLICATIONS

This application claims priority under 35 U.S.C. §119(e) from Provisional Patent Application No. 61/806,712 filed Mar. 29, 2013, entitled "CONTEXT TRANSFER FOR DATA STORAGE," which is hereby incorporated by reference in its entirety.

BACKGROUND

In the exploration and production (E&P) world, data volumes may be large. The data volumes may be used in interpretation applications to make decisions to find oil and gas. Based on the size of data volumes, data stores are often used to store raw and interpreted information. Further, to handle multiple E&P interpreters using the large data volumes, E&P interpreters may manipulate and store a copy of the data in the E&P interpreters' analysis environment. Before or after manipulating the data, the data may be loaded in the shared data store.

SUMMARY

In general, in one aspect, the disclosed subject matter relates to a method for context transfer for data storage. The method includes receiving, from an analysis environment, a request to load a data item for analysis, creating, based on the request, a task request including context information of the data item, transmitting the task request to a data manager environment, receiving, from the data manager environment, an approval of the task request based on the context information, and loading the data item in a master data store in response to the approval.

Other aspects of the invention will be apparent from the following description and the appended claims.

BRIEF DESCRIPTION OF DRAWINGS

The appended drawings illustrate several embodiments of context transfer for data storage and are not to be considered limiting of its scope, for context transfer for data storage may admit to other equally effective embodiments.

FIG. 1.1 is a schematic view, partially in cross-section, of a field in which one or more embodiments of context transfer for data storage may be implemented.

FIG. 1.2 shows a schematic diagram of a system in accordance with one or more embodiments.

DETAILED DESCRIPTION

Figure 2:
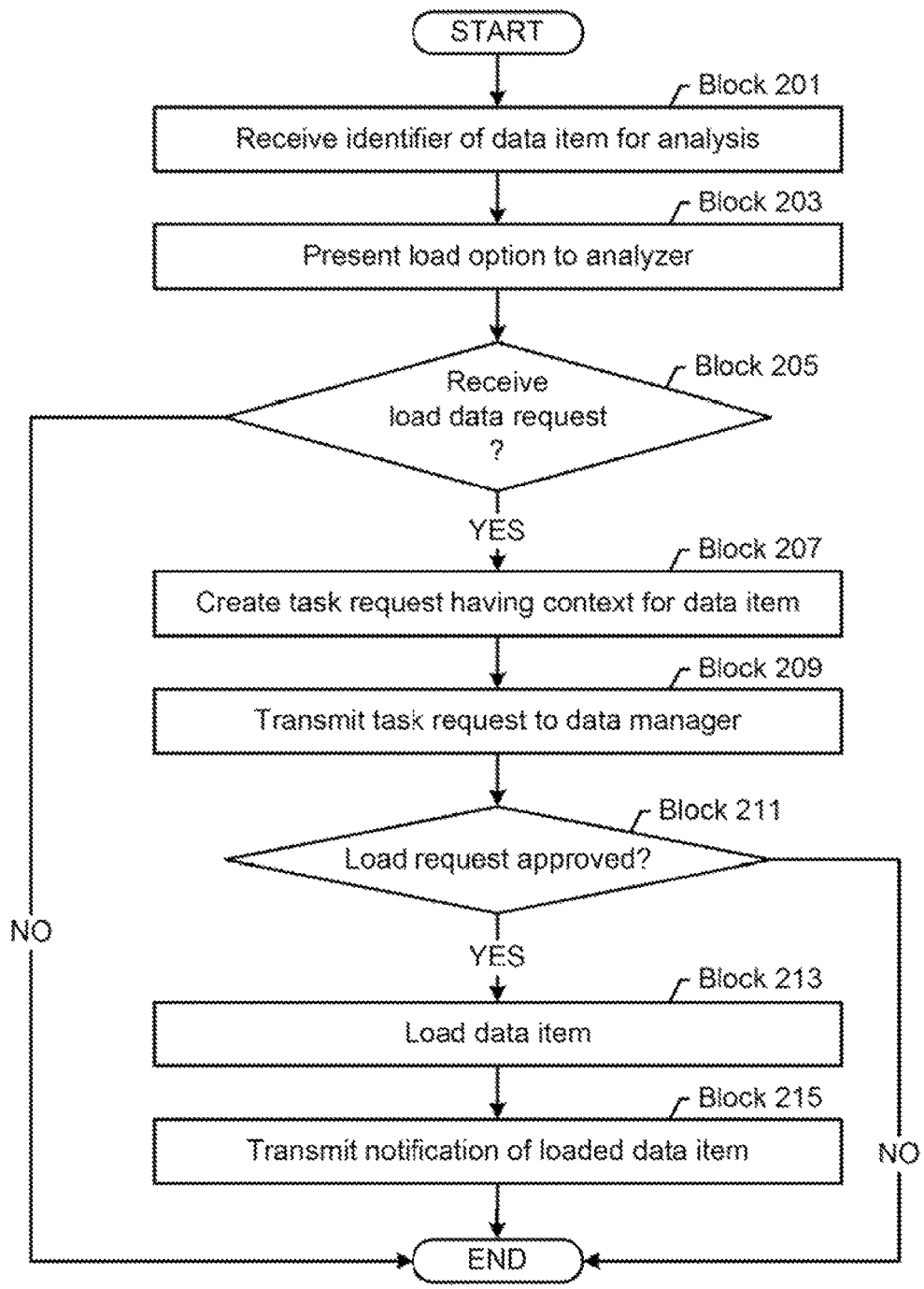
FIG. 2 shows a flowchart in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for transferring context information between an analysis environment and a data manager. For example, in one or more embodiments, in response to a request from an analysis environment to load a data item, a task request is sent to a data manager environment. The task request includes context information defining the data item to be loaded. If an approval is received, then the data item is loaded.

One or more embodiments may apply to the exploration and production (E&P) of hydrocarbons. In the E&P space, information about the context in which a particular data item is used in an interpretation/analysis application can help ensure that additional relevant data is also considered in the interpretation. Indexing external sources (for fast searching) and other technology can help make context information available. These indexed sources can be browsed and filtered to find data in context. Based on the volume of information available in context, which may be ever increasing, best practices and permissions may be defined around loading of context information to user projects.

For example, best practices and permissions may include loading data to a corporate data store before loading the data to user projects. In the example, first loading the data to the corporate data store may ensure data is not being duplicated in either the corporate data store or the user project and conforms to naming conventions. By way of another example, users may exclusively see what data is available in the corporate data store, and be subject to an authorization procedure based on data selected, before being able to load data to the user's projects. One or more embodiments facilitate the above example actions without instantiating or using applications outside of the interpretation or native data management workspace.

One or more embodiments provide a tightly coupled approval and notification process between an E&P application user (e.g., a geoscientist, or any other types of user performing an E&P analysis task) and an administrator user (sometimes referred to herein as a data manager). Thus, one or more embodiments facilitate a request to a data manager to be able to approve or follow certain best practices before data should be loaded to the E&P application user's project store.

FIG. 1.1 depicts a schematic view, partially in cross section, of a field (100) in which one or more embodiments of context transfer for data storage may be implemented. In one or more embodiments, one or more of the modules and elements shown in FIG. 1.1 may be omitted, repeated, and/or substituted. Accordingly, embodiments of context transfer for data storage should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107).

In one or more embodiments, data acquisition tools (102-1), (102-2), (102-3), and (102-4) are positioned at various locations along the field (100) for collecting data of the subterranean formation (104), referred to as survey operations. In particular, these data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by these data acquisition tools. Specifically, the static data plot (108-1) is a seismic two-way response time. Static plot (108-2) is core sample data measured from a core sample of the formation (104). Static data plot (108-3) is a logging trace, referred to as a well log. Production decline curve or graph (108-4) is a dynamic data plot of the fluid flow rate over time. Other data may also be collected, such as historical data, user inputs, economic information, and/or other measurement data and other parameters of interest.

Further as shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, and other wellsite equipment, such as production equipment and logging equipment to perform production operation and logging operation, respectively. Generally, survey operations and wellbore operations are referred to as field operations of the field (100). In addition, data acquisition tools and wellsite equipment are referred to as field operation equipment. These field operations may be performed as directed by a surface unit (112). For example, the field operation equipment may be controlled by a field operation control signal send from the surface unit (112).

In one or more embodiments, the surface unit (112) is operatively coupled to the data acquisition tools (102-1), (102-2), (102-3), (102-4), and/or the wellsite systems (114-1), (114-2), (114-3). In particular, the surface unit (112) is configured to send commands to the data acquisition tools (102-1), (102-2), (102-3), (102-4), and/or the wellsite systems (114-1), (114-2), (114-3) and to receive data therefrom. In one or more embodiments, surface unit (112) may be located at the wellsite systems (114-1), (114-2), (114-3) and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite systems (114-1), (114-2), (114-3), and/or other part of the field (104). The surface unit (112) may also be provided with or functionally for actuating mechanisms at the field (100). The surface unit (112) may then send command signals to the field (100) in response to data received, stored, processed, and/or analyzed, for example to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as performing seismic interpretation or borehole resistivity image log interpretation to identify geological surfaces in the subterranean formation (104) or performing simulation, planning, and optimization of production operations of the wellsite systems (114-1), (114-2), (114-3). In one or more embodiments, the result generated by the E&P computer system (118) may be displayed for user viewing using a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

FIG. 1.2 shows more details of the E&P computer system (118) in which one or more embodiments of context transfer for data storage may be implemented. In one or more embodiments, one or more of the modules and elements shown in FIG. 1.2 may be omitted, repeated, and/or substituted. Accordingly, embodiments of context transfer for data storage should not be considered limited to the specific arrangements of modules shown in FIG. 1.2.

As shown in FIG. 1.2, the system may include one or more of a master data store (150), a data management application (155), one or more analysis environments (e.g., analysis environment X (152), analysis environment Y (154)), and a data manager environment (156). Each of these components is discussed below.

In one or more embodiments, a master data store (150) is any type of storage unit and/or device (e.g., a file system, collection of tables, or any other storage mechanism) for storing data volumes. Further, the master data store (150) may span multiple different storage units and/or devices. The multiple different storage units and/or devices may or may not be of the same type or located at the same physical site.

In one or more embodiments, the master data store (150) may include functionality to store exploration and production (E&P) data. E&P data corresponds to data describing an oilfield. Specifically, the E&P data may include data stored in the master data store (150) gathered directly from sensors located at the oilfield. The E&P data stored in the master data store (150) may include processed data, simulation results, and other types of data from the oilfield. Other data may be in the master data store (150) without departing from the scope of one or more embodiments.

Continuing with FIG. 1.2, an analysis environment (e.g., analysis environment X (152), analysis environment Y (154)) is hardware and/or software that provides the execution environment for an application. For example, the analysis environment may be a physical server, a personal computer, a network terminal, a group of servers, an operating system, a virtual machine, or any other hardware and/or software or combination thereof. In one or more embodiments, analysis environments are remote from each other, the master data store (150), the data manager environment (156), and the data management application (155).

In one or more embodiments, each analysis environment (e.g., analysis environment X (152), analysis environment Y (154)) includes an application (e.g., analysis application X (158), analysis application Y (160)) and a project data store (e.g., project data store X (162), project data store Y (164). Both of these components are discussed below.

In one or more embodiments, an analysis application (e.g., analysis application X (158), analysis application Y (160)) is a software program that includes functionality to read and/or manipulate data items in the corresponding project data store (e.g., project data store X (162), project data store Y (164)). For example, the analysis application (e.g., analysis application X (158), analysis application Y (160)) may be an E&P application. In one or more embodiments, each analysis application accesses the application's own corresponding project data store. Further, each analysis application may be prohibited from accessing another analysis application's corresponding project data store. In one or more embodiments, analysis applications may be instances of the same software program or different software programs. For example, one analysis application may be an oilfield pipeline simulator while another analysis application simulates the wellsite. By way of another example, at least a portion of the analysis applications may be E&P interpreter(s). In one or more embodiments, each analysis application (e.g., analysis application X (158), analysis application Y (160)) is used by a user, such as a geoscientist, or any other types of user performing an E&P analysis task.

In one or more embodiments, a project data store (e.g., project data store X (162), project data store Y (164)) is an environment that isolates data from the master data store (150). In one or more embodiments, the project data store and the master data store (150) are located on different machines and physically separated from each other. In one or more embodiments, exchange of data between the project data store and the master data store (150) are permission based. In other words, updates to the project data store are not automatically propagated to the master data store (150) in one or more embodiments. Further, prior to storing updates to the project data store in the master data store (150), the updates may be validated using one or more rules for quality control. In some embodiments, a user of the analysis application may initiate the updating of the data to the master data store (150). The updates may be prevented from storage in the master data store (150) without prior approval by an administrator user. Thus, the isolation provides a mechanism for maintaining the integrity of data in the master data store (150). For example, the data items in the project data store may be new data for storage in the master data store (150) or data obtained from the master data store (150). The data items may correspond to software code or data for manipulation by software code. In one or more embodiments, the project data store may be used to protect live data in the master data store (150) and prevent the introduction of errors by the corresponding application until such data is vetted.

Continuing with FIG. 1.2, in one or more embodiments, the data management application (155) includes functionality to implement a centralized management scheme for data. Such centralized management scheme may include ensuring that the data complies with best practices, security requirements, naming conventions, and other requirements. Specifically, the data management application (155) may include functionality to receive requests to load or obtain one or more data items to and from the master data store (150) and/or the project data store, determine whether the request is subject to approval, obtain context information about the data item, generate task requests with the context information, and obtain approval or denial of the loading.

Context information describes the context in which a data item is used or will be used. For example, rather than describing the data item or user name of the user or just the data item or user name, the context information may include the setting in which the data item is used by the user. In other words, the context information may describe to the administrator user a set of circumstances surrounding the use of the data item by the user of the analysis application. In one or more embodiments, the context information includes spatial context, project context, visualization context, profile context, and application context. The spatial context includes spatial information related to the data item. For example, the spatial context may describe, for geographic data, the geographic location described by the geographic data. The project context includes project related information of the data item. For example, the project context may describe the user's project for which the user is using the data item. The visualization context includes configuration information of the visualization window for presenting the data item. For example, the visualization context may describe what is being displayed (e.g., report names, graphs, or other elements) to the user of the data item. The profile context includes user and/or project profile information related to the data item. For example, the profile context may describe the user (e.g., name of the user, employment title of the user, project in which the user is involved, statistics describing the user modifications to the master data store (150), or other information, or a combination thereof) and/or may describe the project (e.g., name of the project, description of the project, importance level of the project to the organization, number of users involved in the project, or other information, or a combination thereof). The application context includes information of an analysis application for which the data item will be used. For example, the application context may include the name and version of the analysis application. Examples of context information are described in reference to FIG. 5 below. In one or more embodiments, the data management application (155) is connected to a data manager environment (156).

The data manager environment (156) provides a software and/or hardware environment for an administrator user to approve or deny task requests. In particular, the administrator user of the data management application (155) may be distinct from the user of the analysis application (e.g., analysis application X (158), analysis application Y (160)). Throughout this disclosure, the term "user" refers to the user of the analysis application unless explicitly stated otherwise. In addition, the user of the application may also be referred to as an "analyzer user" or simply "analyzer" to explicitly differentiate from the administrator user or data manager.

While FIG. 1.2 shows a configuration of components, other configurations may be used without departing from the scope. For example, various components may be combined to create a single component. As another example, the functionality performed by a single component may be performed by two or more components.

One or more embodiments store context information throughout a data access request so that loading and notifications are handled seamlessly between a geoscientist and a data manager in the context of searching for oil and gas related data items. For example, one or more embodiments may provide a mechanism for: a geoscientist to request data items found in the immediate context of something that the geoscientist is working on; the data manager to see requests from the geoscientist; and the data manager to open the request to bring up a visual view of the data items being requested by the geoscientist without the data manager having to search for information that the geoscientist is requesting. In another example, one or more embodiments may provide a mechanism for the data manager to see overlaps between data (e.g., from different sources including the master data store (150)) requested to be loaded by different analyzer users and to assess the quality of the data requested to be loaded to decide upon which data, if any, should be loaded. Further in accordance with one or more embodiments, the data manager may use the context information captured from the geoscientist's application to understand how the requested data will be used, and thus assure data fidelity and quality. Accordingly, the data manager may select at least a subset of the data items being requested for the geoscientist and may load the data items to the master data store (150) or grant permission for the user to load this information to his project data store himself. In one or more embodiments, based on the geoscientist's original request, the geoscientist may be notified that the data is ready for loading. Further, in one or more embodiments, the analyzer user may open this status update to view the data once again and load the data directly from the master data store (150) to the project data store without re-searching for the data. Additional functionality details of the data management application (155) are described in reference to FIG. 2 below.

FIG. 2 shows an example flowchart in one or more embodiments. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

In block 201, an identifier of a data item is received. For example, an analyzer (i.e., analyzer user) who is using an analysis application in an analysis environment may identify data from the project data store, the master data store (150), sensors, or another data repository. By way of another example, the analysis application used by the analyzer may automatically identify the data item. In block 203, a load option is presented to the analyzer in one or more embodiments. Specifically, the analysis application may present the analyzer with an option to load the data item into the master data store (150) or project data store.

In block 205, in one or more embodiments, a determination is made whether a load data request is received. For example, a determination is made whether the analyzer requested to load the data item. If the analyzer does not request to load the data item, then flow may proceed to end.

In block 207, if a load data request is received, a task request having context information for the data item is created. In one or more embodiments, the context information includes metadata about the data item. For example, the context information may include a unique identifier of the data item, size, author or originator of the data item, and other information. In one or more embodiments, the task request is an indication that a task is waiting for approval.

In block 209, in one or more embodiments, the task request is transmitted to the data manager. For example, the task request may be transmitted via the data management application (155) to the data manager environment (156). The data manager may be notified of the new task via pop-up box when the data manager uses the data manager environment (156), text message, email, or any other form of notification.

In block 211, in one or more embodiments, a determination is made whether the load data request is approved. Specifically, the task request may include a selection option for the data manager to select whether loading the data item is approved. The data manager may review the context information, and/or information derived therefrom to ensure that the data item complies with rules and requirements for loading the data item.

In one or more embodiments, the context information may be analyzed to generate an alert. The alert indicates to the analyzer user and/or the data manager that special attention may be needed regarding the load data request. For example, the alert may be based on a rule defined within the database specifying that data items having locations within 100 ft from each other are considered identical field objects (e.g., wells) that the data manager is alerted to pay closer attention to. In another example rule, two wells that have the same name but different. Unique Well Identifier (UWI) are considered as the same well. In these two examples, alerts generated warn the data manager and prevent data items of the same well from potentially being loaded twice. Prior to receiving the approval of the load data request, the alert is also transmitted to the data manager environment (156) for evaluating the load data request. For example, the alert may indicate that a quality level of the requested data item is below a threshold. In another example, the alert may indicate duplication of the data item with respect to a concurrent load data request that has not been completed. The concurrent load data request may be submitted by a different analysis environment used by a different analyzer user.

In block 213, if the load data request is approved, then the data item may be loaded. For example, if the load data request is to load the data item in the master data store (150), then the data item is loaded in the master data store (150). If the request is to load the data item into the project data store, then the data item is loaded into the project data store. The process of performing the loading may include following rules and requirements of the centralized management scheme. For example, the name of the data item, when loaded, may be updated to comply with a naming convention specified by the centralized management scheme. For example, the naming convention may require the name of the data item to be case sensitive, appended by a creator's organization identifier, etc. By way of another example, if the analyzer requests to load the data item into the project data store only, but the centralized management scheme requires all data in the project data store to be in the master data store (150), then the data item is loaded in both the master data store (150) and the project data store regardless of the analyzer's request.

In one or more embodiments, the context information may be analyzed to identify or create a supplemental information list of additional relevant data that is not included in the load data request but may be relevant to the analyzer. For example, if the context information identifies the requested data item as related to a reservoir modeling task, the supplemental data may include newly processed geophysics data that outdates the requested data item. Prior to loading the requested data item, the supplemental information list is transmitted to the data manager environment (156) as a reference. For example, the supplemental information list may be presented to a data manager user who selects a supplemental data item from the supplemental information list as relevant data. Accordingly, the supplemental data item is loaded in the master data store (150) in response to the selection and the approval.

In block 215, in one or more embodiments, a notification of the loaded data item is transmitted. In one or more embodiments, the notification is transmitted to the analysis environment. Thus, the analyzer is able to know that the loading is completed.

Figure 3:
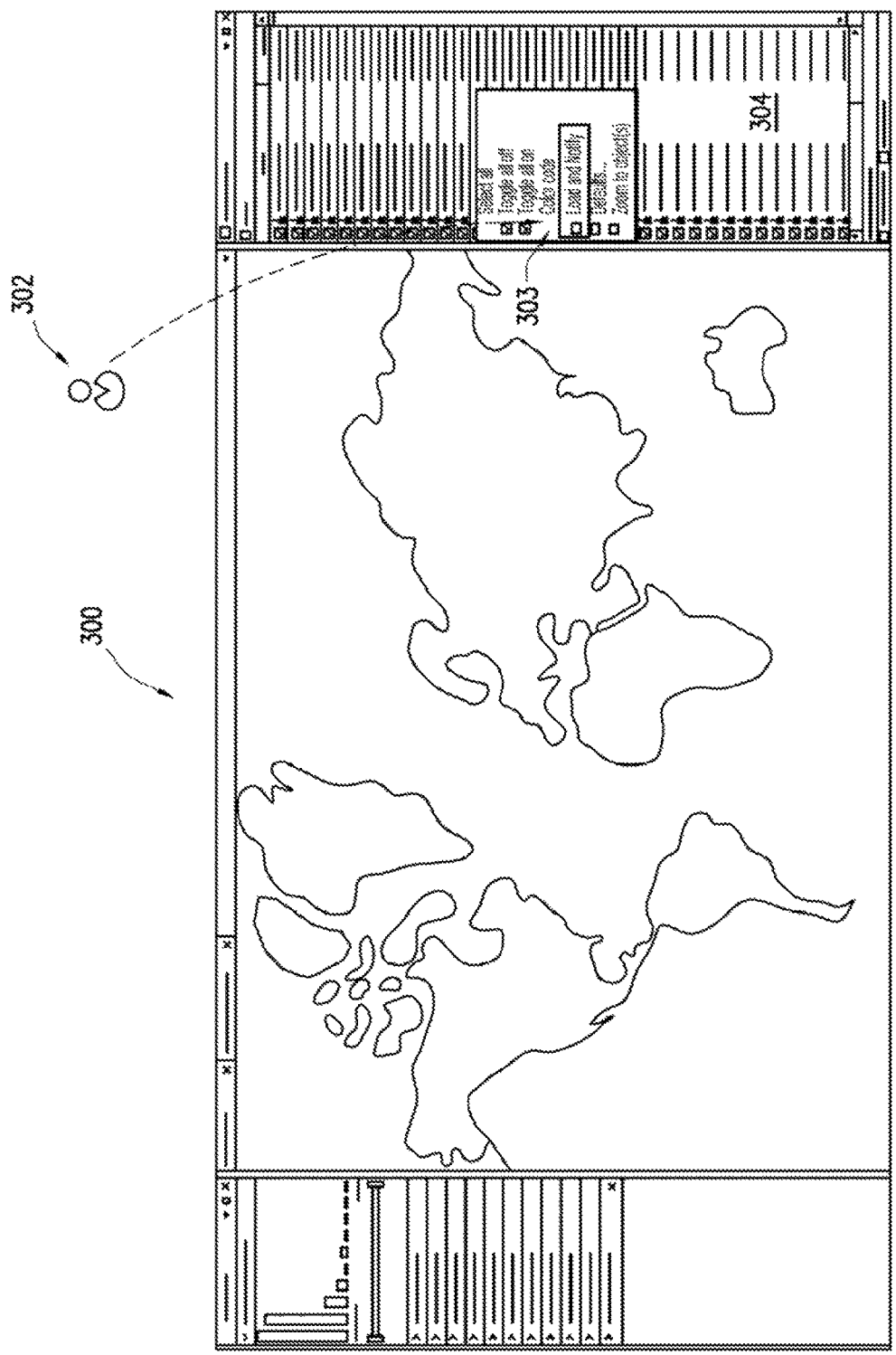
FIGS. 3-9 show an example in accordance with one or more embodiments.

FIGS. 3-9 show an example in one or more embodiments. In the example, consider the scenario in which the analyzer user is a geoscientist. The following example is for example purposes and not intended to limit the scope of the claims. FIG. 3 shows a user interface (300) of an analysis application used by a geoscientist (302). In FIG. 3, the geoscientist (302) may search and filter across indexes of data such as the index (303) that is highlighted in the information index window (304) upon being selected. Upon finding data of interest, as identified by the index (303), the geoscientist (302) may try to load the data into his project. At least some of the data may not be loadable due to permissions or, in the example case, enforcement practices of getting sonic data into the master data store (150) first to ensure there are not duplicates, etc.

Figure 4:
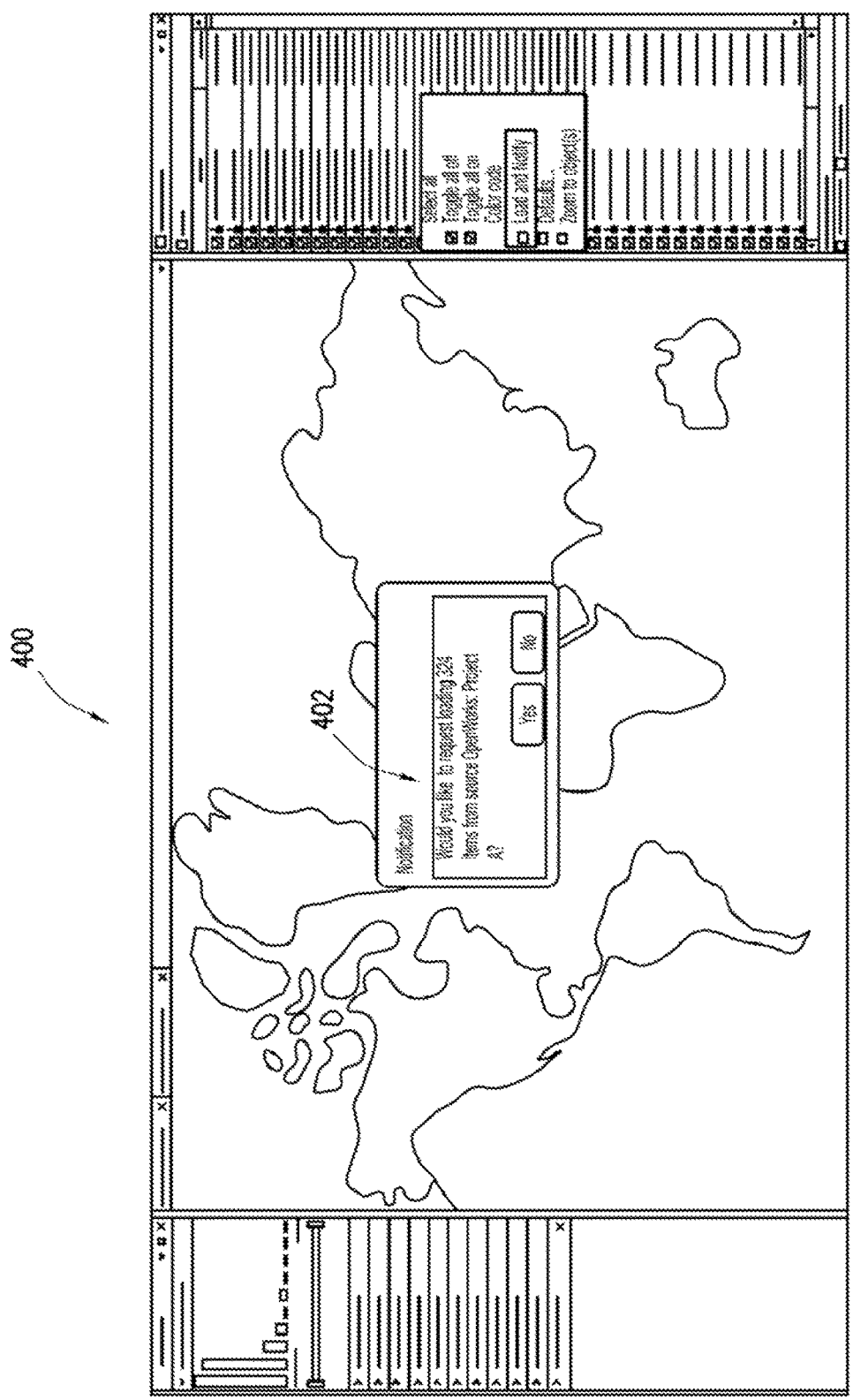
Figure 5:
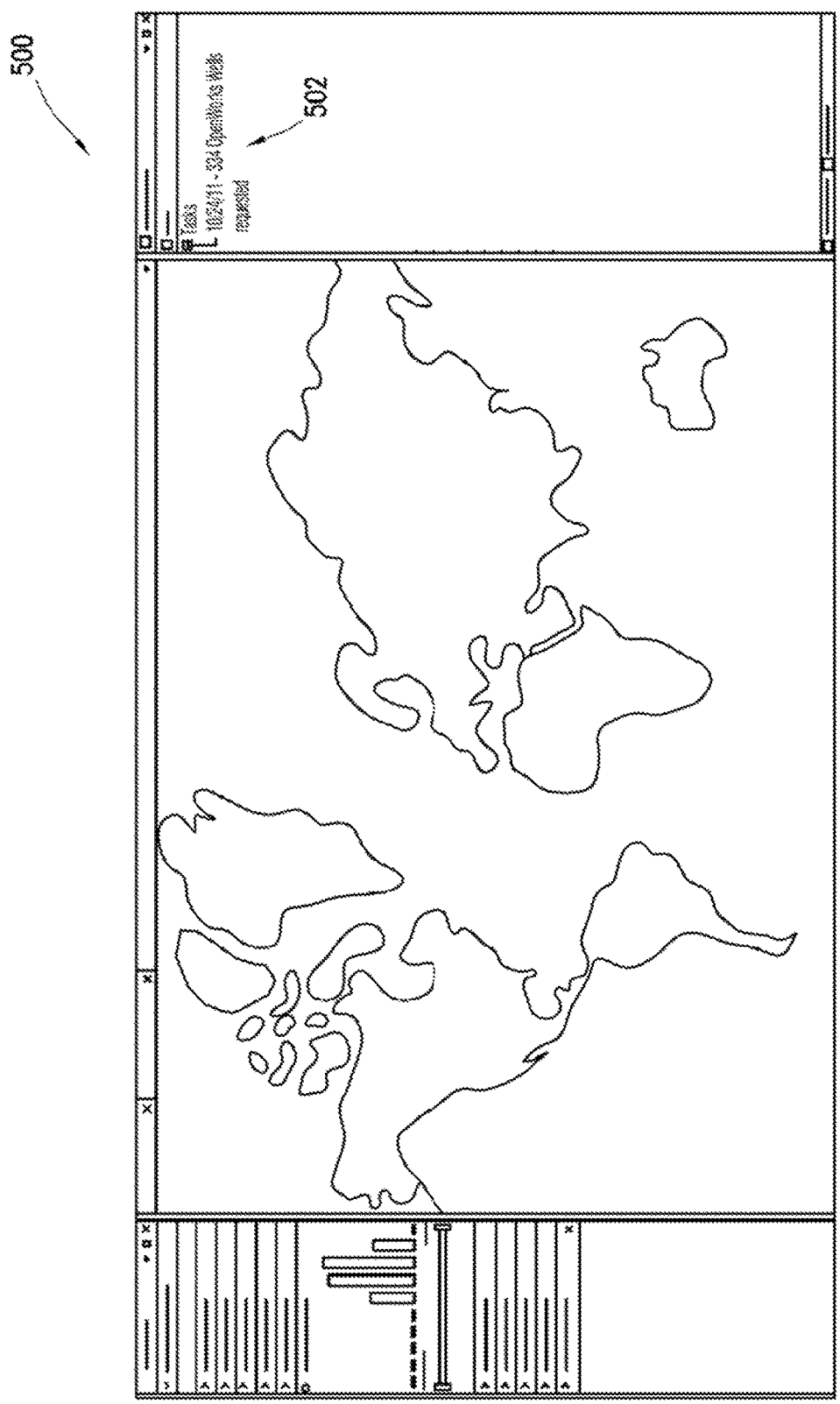

FIG. 4 shows the geoscientist user interface (400) with a request to confirm the loading of data in one or more embodiments. In the example, a popup box (402) is displayed. If the geoscientist requests the loading of data by selecting "yes", a task request is created to know what is pending within the user's project environment in one or more embodiments. FIG. 5 shows the geoscientist user interface (500) with the task request (502). Thus, the geoscientist may be informed that a task is currently pending.

As described above, the task request (502) includes a list of requested data items and the context information associated with the data items. In particular, the context information is captured from the analysis environment of a user (e.g., the geoscientist). Examples of the captured context information may include the following:
 a. The spatial area the geoscientist is viewing (e.g., North: 67, South: 64, West: 6, East: 9, Depth: Below 1500 m)
 b. The business project being worked on by the geoscientist (e.g., Regional re-interpretation of Base Tilje Formation, 4D processing of August 2013 seismic survey on Njord, etc.)
 c. The type of visualization windows the geoscientist is viewing (e.g., 2D map, 3D map, well cross section, data cross plot)
 d. User's application profile/perspective (e.g., Geophysical Interpretation, Reservoir Modeling, Production Monitoring, etc.)
 e. The application currently being used in the analysis environment (e.g., Seismic Interpretation, History Matching, etc.)

Two or more users may generate task requests concurrently. In an example scenario, an exploration geologist Rene and a reservoir geophysicist John both request data to be loaded from two different indexed data sources to a corporate repository.

Figure 6:
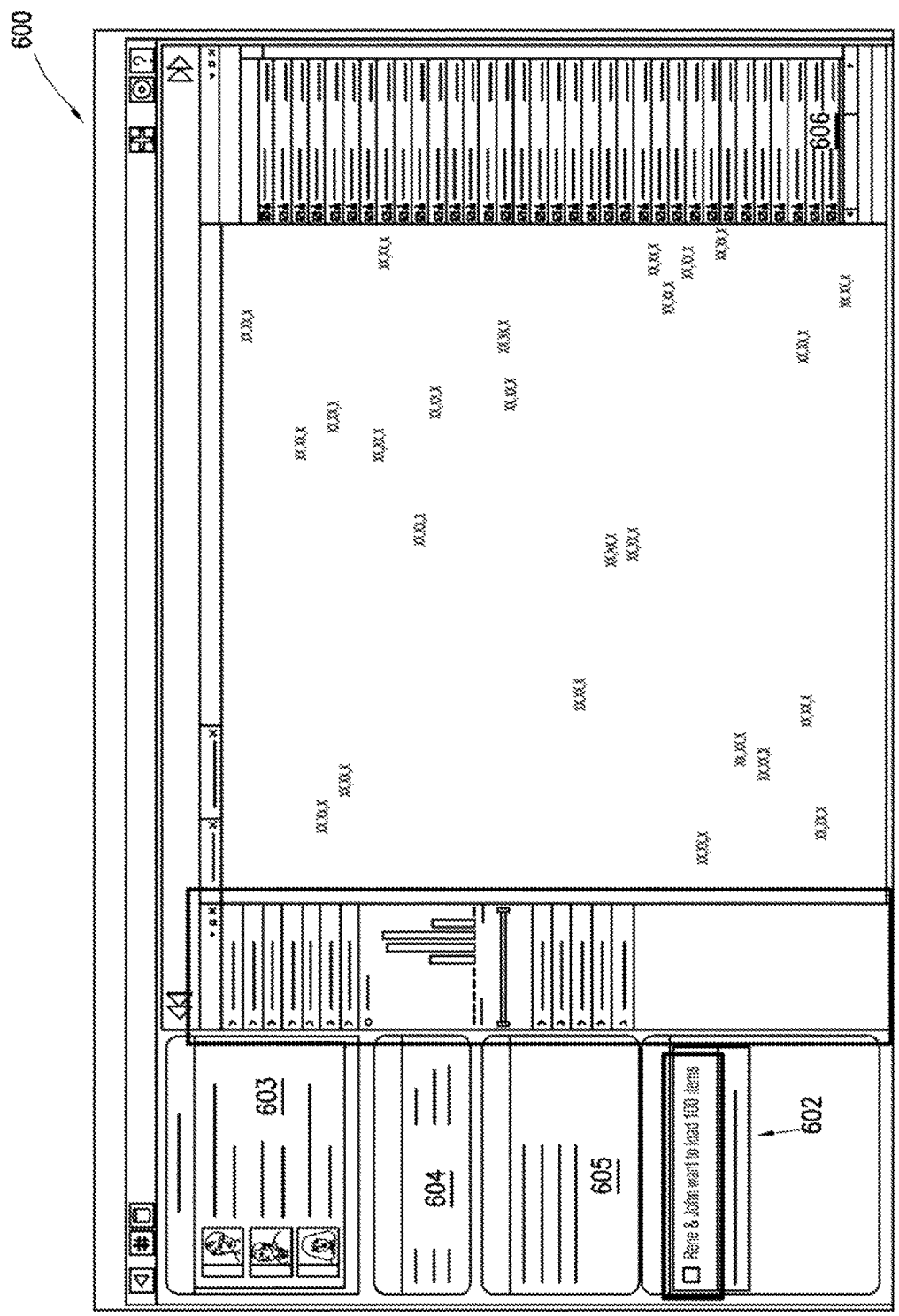

In the data management application (155), the task requests are passed through a master data store (150) as messages. Based on messages in this master data store (150), these task requests are shown to the data manager. FIG. 6 shows an example data manager user interface (600) of a data manager environment with a message window (602) indicating the task requests from Rene and John. The data manager can review information regarding these task requests, such as the lists of requested data items, and the captured context information. In addition, the example data manager user interface (600) includes a analyzer user list window (603) showing analyzer users who may request data, a data repository list window (604) showing various data repositories from which analyzer users may request data, and an analysis environment list window (605) showing various analysis environments of the analyzer users.

Figure 7:
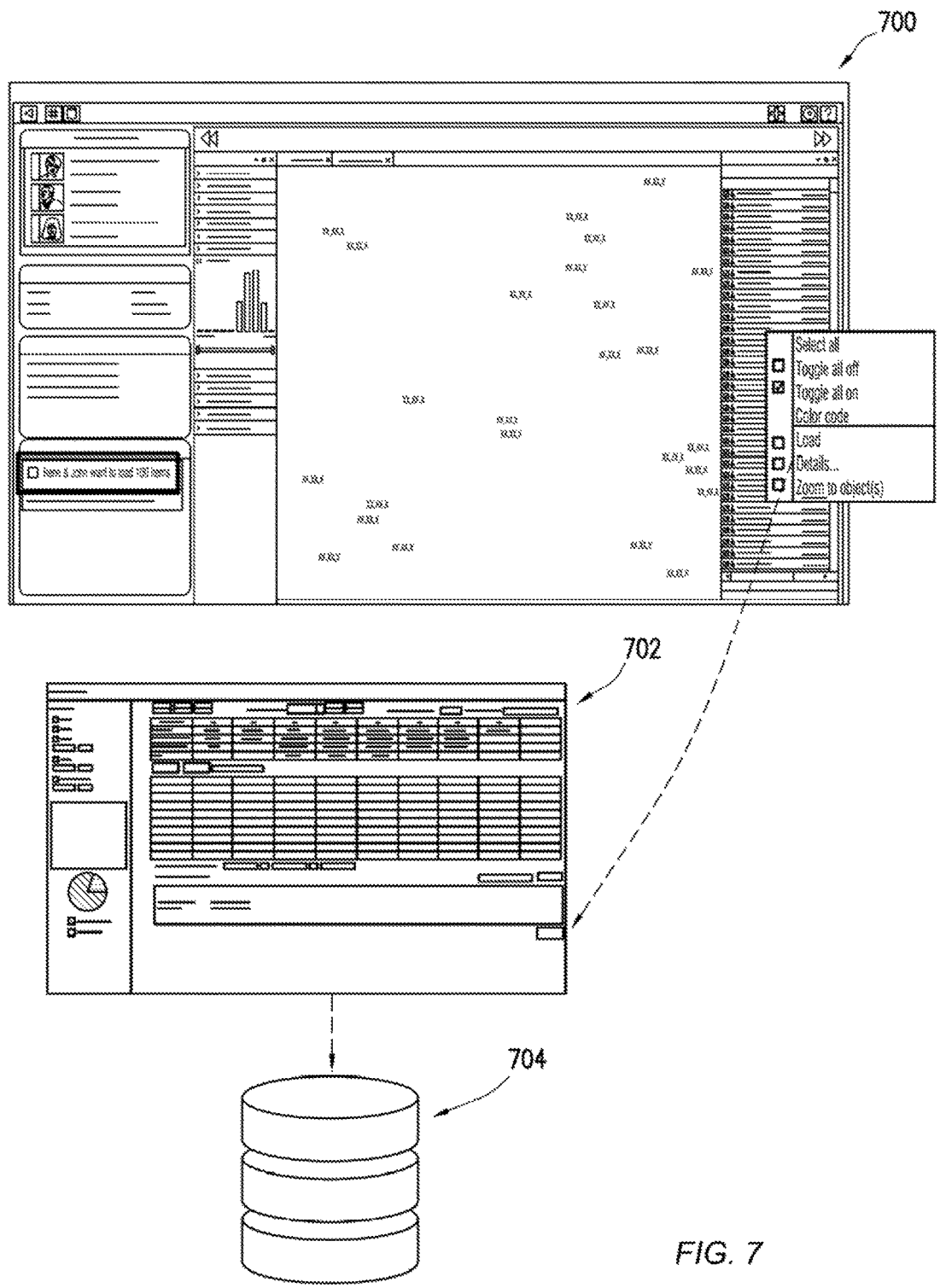
Figure 8:
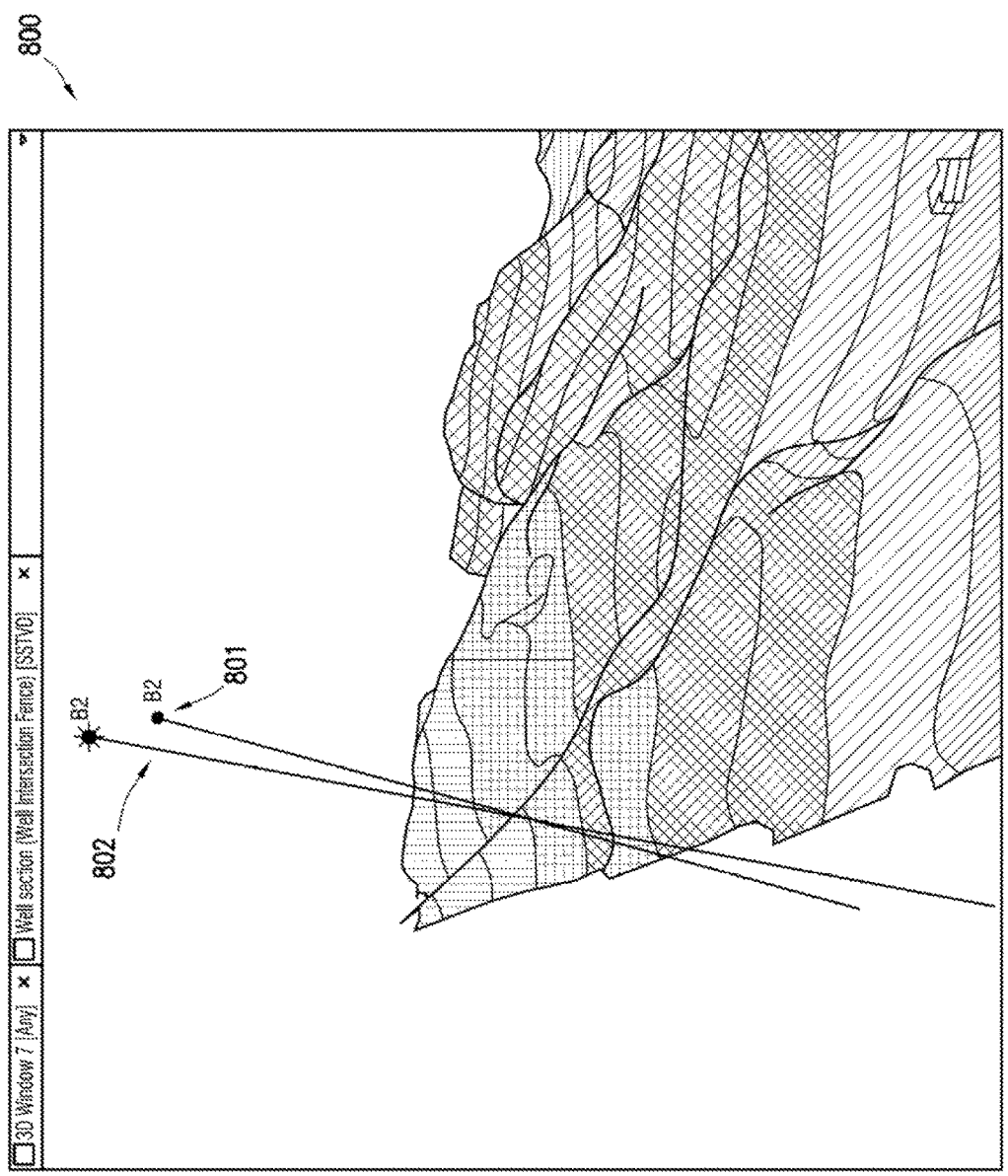

FIG. 7 shows the example data manager user interface (700) when the data manager selects a message. In one or more embodiments, using data manager user interface (700), the data manager selects a message which opens a view (702) for viewing information regarding the task request(s) identified by the selected message. Although the view (702) is shown in FIG. 7 to include a data table, the view (702) may also include a graphical representation, such as a graphical view (800) shown in FIG. 8. Based on viewing the information displayed in the view (702) and graphical view (800), the data manager takes the following actions:
 a. According to matching rules in the data management application (155), an alert is automatically generated to indicate to the data manager that well data (801) shown in FIG. 8 and well data (802) shown in FIG. 8, specified by the task requests relate to the same well. The data manager selects which specified well data to load into the master data store (704).
 b. John is automatically identified as a reservoir geophysist based on the captured context information. A pre-determined list of relevant information for the reservoir geophysist is automatically presented to the data manager based on the captured context information. For example, the list may include the newly processed geophysics well log suit that outdates the requested well data. Accordingly, the data manager supplements the requested well data by including additional information form this list when loading the requested well data into the master data store (704).
 c. According to quality control rules in the data management application (155), an alert is automatically generated to indicate to the data manager that certain information (e.g., magnetic reference for azimuth of a well trajectory) is missing in the well data requested by Rene, and that the requested well data is classified as low quality data not to be used for resource volume calculations. Based on the captured spatial context information. Rene is automatically identified as working on a regional scale with seismic interpretation. The data manager then concludes that the low quality data can be used for Rene's project. The data manager overrides the quality control rules, and loads the data while tagging the loaded data with a low quality tag.

In summary, the data manager loads requested data into the master data store (704) through a loader interface which ensures data conforming to best practices and without duplication. For example, the data manager, the data management application (155), the data manager environment (156), or a combination thereof may confirm that the loaded data items comply with best practices.

Figure 9:
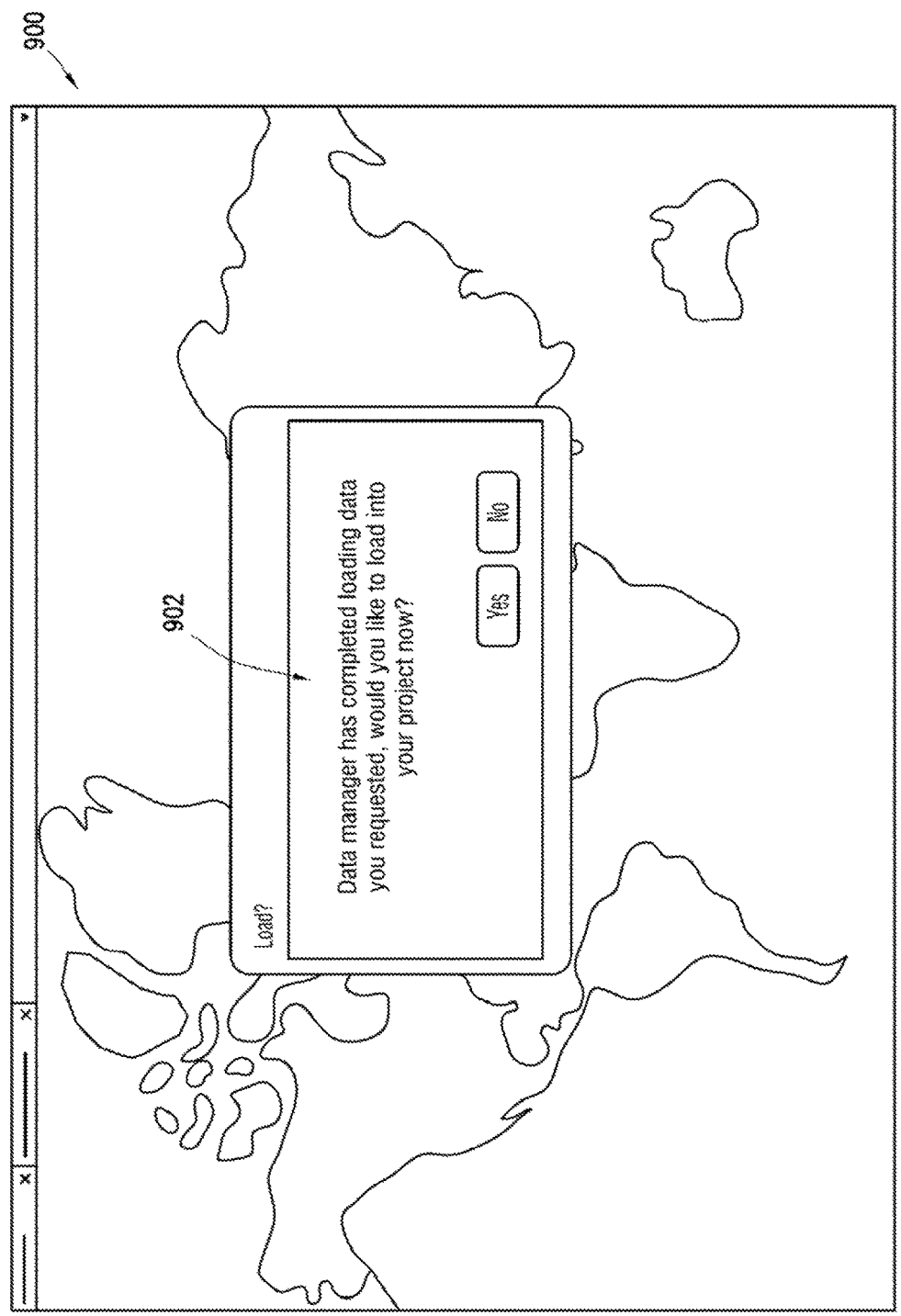

Returning to the discussion of FIG. 7, from the data manager user interface (700), the data manager checks off the task request(s) that has been completed. In response, a notification is transmitted to the geoscientist. For example, FIG. 9 shows the example geoscientist user interface (900) of the geoscientist's analysis application. As shown in FIG. 9, the geoscientist (e.g., Rene and/or John) receives a note (902) that his/her task request has been completed. The note may ask whether the geoscientist would like the data loaded to his/her project. If the geoscientist requests the data to be loaded in his/her project, then the data is added to the geoscientist's project data store in one or more embodiments.

Embodiments may be implemented on virtually any type of computing system regardless of the platform being used.

Figure 10:
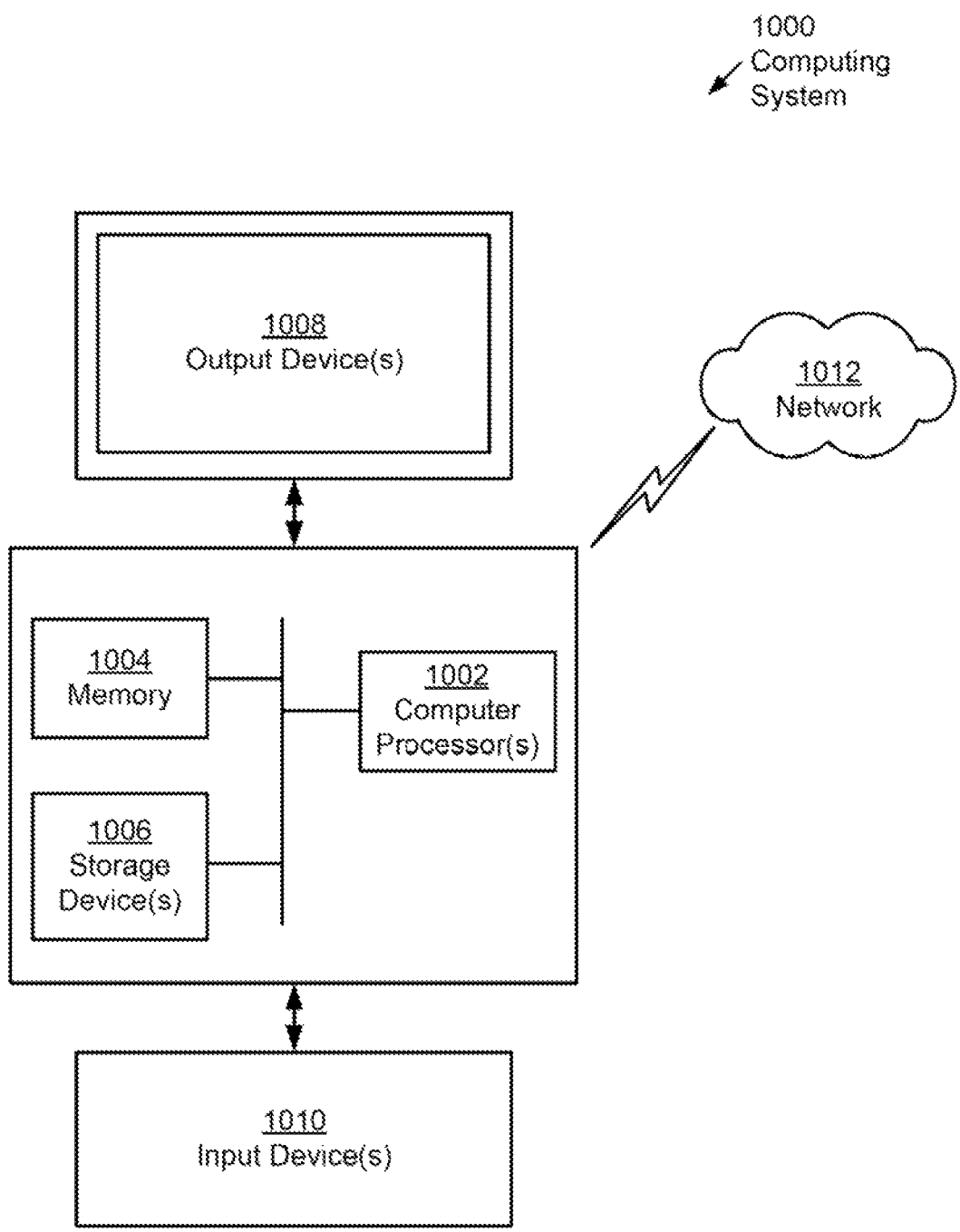
FIG. 10 shows a computing system in accordance with one or more embodiments.

For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVI), storage device, a diskette, a tape, flash memory, physical memory, or any other computer readable storage medium. Specifically, the software instructions may correspond to computer readable program code that when executed by a processors), is configured to perform embodiments.

Further, one or more elements of the aforementioned computing system (1000) may be located at a remote location and connected to the other elements over a network (1012). Further, embodiments may be implemented on a distributed system having a plurality of nodes, where each portion may be located on a different node within the distributed system. In one embodiment, the node corresponds to a distinct computing device. The node may correspond to a computer processor with associated physical memory. The node may correspond to a computer processor or micro-core of a computer processor with shared memory and/or resources.

While one or more embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for context transfer for data storage comprising:
    receiving, from an first analysis environment, a first request to load the first data item for analysis;
    creating, based on the first request, a first task request comprising first context information identifying a first characteristic of the one or more field objects related to the first data item within the first analysis environment;
    receiving, from a second analysis environment, a second request to load the second data item for analysis;
    creating, based on the second request, a second task request comprising second context information identifying a second characteristic of the one or more field objects related to the second data item within the second analysis environment;
    transmitting the first task request and the second task request to a data manager environment;
    comparing, by the data manager environment, the first context information identified in the first task request and the second context information identified in the second task request to determine a match between the first characteristic and the second characteristic of the one or more field objects;
    determining, based on the match between the first characteristic and the second characteristic of the one or more field objects, a duplication between the first data item and the second data item;
    generating, by the data manager in response to determining the duplication, a selected data item from the first data item and the second data item;
    receiving, from the data manager environment, an approval to load the selected data item for the first analysis environment and the second analysis environment; and
    loading, in response to the approval, the selected data item in a master data store for access and analysis by the first analysis environment and the second analysis environment.

2. The method of claim 1, further comprising:
    analyzing the first context information to generate an alert; and
    transmitting, prior to receiving the approval, the alert to the data manager environment,
    wherein the approval is further based on the alert.

3. The method of claim 2,
    wherein the alert indicates that a quality level of the first data item is below a threshold.

4. The method of claim 2,
    wherein the alert indicates the duplication.

5. The method of claim 1, further comprising:
    identifying a supplemental information list based on the first context information;
    transmitting, prior to loading the selected data item, the supplemental information list to the data manager environment;
    receiving, from the data manager environment, a selection of a supplemental data item based on the supplemental information list; and
    further loading the supplemental data item in the master data store in response to the selection and the approval.

6. The method of claim 1,
    wherein the first request is submitted by a user of the first analysis environment.

7. The method of claim 1,
    wherein the request is generated by an application of the analysis environment, and wherein the first context information identifies a context of the use of the first data item within the first analysis environment by identifying at least one selected from a group consisting of spatial information, project information, visualization configuration, user and project profile, and information of the application that are related to the first data item.

8. A system for context transfer for data storage comprising:
a master data store configured to store a plurality of data items;
a computer processor; and
a data management application executing on the computer processor and configured to:
receive, from an first analysis environment, a first request to load the first data item for analysis;
create, based on the first request, a first task request comprising first context information identifying a first characteristic of the one or more field objects related to the first data item;
receive, from a second analysis environment, a second request to load the second data item for analysis;
create, based on the second request, a second task request comprising second context information identifying a second characteristic of the one or more field objects related to the second data item;
transmit the first task request and the second task request to a data manager environment;
compare, by the data manager environment, the first context information identified in the first task request and the second context information identified in the second task request to determine a match between the first characteristic and the second characteristic;
determine, based on the match between the first characteristic and the second characteristic, a duplication between the first data item and the second data item;
generate, by the data manager in response to determining the duplication, a selected data item from the first data item and the second data item;
receive, from the data manager environment, an approval to load the selected data item for the first analysis environment and the second analysis environment; and
load, in response to the approval, the selected data item in the master data store for access and analysis by the first analysis environment and the second analysis environment.

9. The system of claim 8, the data management application further configured to:
analyze the first context information to generate an alert; and
transmit, prior to receiving the approval, the alert to the data manager environment,
wherein the approval is further based on the alert.

10. The system of claim 9,
wherein the alert indicates that a quality level of the first data item is below a threshold.

11. The system of claim 9,
wherein the alert indicates the duplication.

12. The system of claim 8, the data management application further configured to:
identify a supplemental information list based on the first context information;
transmit, prior to loading the selected data item, the supplemental information list to the data manager environment;

receive, from the data manager environment, a selection of a supplemental data item based on the supplemental information list; and
further load the supplemental data item in the master data store in response to the selection and the approval.

13. The system of claim 8,
wherein the first request is submitted by a user of the first analysis environment.

14. The system of claim 8,
wherein the request is generated by an application of the analysis environment, and
wherein the first context information identifies a context of the use of the first data item within the first analysis environment by identifying at least one selected from a group consisting of spatial information, project information, visualization configuration, user and project profile, and information of the application that are related to the first data item.

15. A non-transitory computer readable medium comprising computer readable program code for:
receiving, from an first analysis environment, a first request to load the first data item for analysis;
creating, based on the first request, a first task request comprising first context information identifying a first characteristic of the one or more field objects related to the first data item;
receiving, from a second analysis environment, a second request to load the second data item for analysis;
creating, based on the second request, a second task request comprising second context information identifying a second characteristic of the one or more field objects related to the second data item;
transmitting the first task request and the second task request to a data manager environment;
comparing, by the data manager environment, the first context information identified in the first task request and the second context information identified in the second task request to determine a match between the first characteristic and the second characteristic;
determining, based on the match between the first characteristic and the second characteristic, a duplication between the first data item and the second data item;
generating, by the data manager in response to determining the duplication, a selected data item from the first data item and the second data item;
receiving, from the data manager environment, an approval to load the selected data item for the first analysis environment and the second analysis environment; and
loading, in response to the approval, the selected data item in a master data store for access and analysis by the first analysis environment and the second analysis environment.

16. The non-transitory computer readable medium of claim 15, further comprising computer readable program code for:
analyzing the first context information to generate an alert; and
transmitting, prior to receiving the approval, the alert to the data manager environment,
wherein the approval is further based on the alert.

17. The non-transitory computer readable medium of claim 16,
wherein the alert indicates low quality of the first data item.

18. The non-transitory computer readable medium of claim 16,
wherein the alert indicates the duplication.

19. The non-transitory computer readable medium of claim 15, further comprising computer readable program code for:
- identifying a supplemental information list based on the first context information;
- transmitting, prior to loading the selected data item, the supplemental information list to the data manager environment;
- receiving, from the data manager environment, a selection of a supplemental data item based on the supplemental information list; and
- further loading the supplemental data item in the master data store in response to the selection and the approval.

20. The non-transitory computer readable medium of claim 15,
- wherein the request is generated by an application of the analysis environment, and
- wherein the first context information identifies a context of the use of the first data item within the first analysis environment by identifying at least one selected from a group consisting of spatial information, project information, visualization configuration, user and project profile, and information of the application that are related to the first data item.

* * * * *